US006254074B1

(12) United States Patent
Di Padova

(10) Patent No.: US 6,254,074 B1
(45) Date of Patent: Jul. 3, 2001

(54) CLAMPING DEVICE

(76) Inventor: Giuseppe Di Padova, 65, Via F. lli Kennedy, 46047 Porto Mantovano (IT)

( * ) Notice: Subject to any disclaimer, the term of this patent is extended or adjusted under 35 U.S.C. 154(b) by 0 days.

(21) Appl. No.: 09/264,765

(22) Filed: Mar. 9, 1999

(30) Foreign Application Priority Data

Mar. 9, 1998 (IT) ............................................ MN98A0012

(51) Int. Cl.[7] ........................................................ B23Q 1/00
(52) U.S. Cl. ...................... 269/43; 269/254 CS; 269/239
(58) Field of Search ................................ 269/43, 254 CS, 269/239

(56) References Cited

U.S. PATENT DOCUMENTS 1,117,662 * 11/1914 Graham .................................. 269/93
1,220,899 * 3/1917 Sorensen ........................ 269/254 CS
4,072,303 * 2/1978 Szabo .................................. 269/254
5,041,028 * 8/1991 Stahle .................................. 439/822
5,050,921 * 9/1991 Hultquist .............................. 294/118
5,373,596 * 12/1994 Harrell ................................ 12/115.4
5,791,210 * 8/1998 Wolff ...................................... 81/302

FOREIGN PATENT DOCUMENTS 21 12601 * 11/1970 (FR) ............................... 269/254 CS
1068255A * 1/1984 (SU) ............................... 269/254 CS

* cited by examiner

*Primary Examiner*—Joseph J. Hail, III
*Assistant Examiner*—Daniel Shanley
(74) *Attorney, Agent, or Firm*—Thomas R. Vigil

(57) ABSTRACT

The object of the present invention is a clamping device which comprises a first element and a second element which are arranged symmetrically, rotatably engaged and mutually constrained, and engagement means which are constrained firmly to the first element and envisaged to engage with the second element. The device is designed to operate from a resting position, in which the first element is in contact with the second element, and from a working position, in which the first element and the second element perform a clamping and constraining action on an object. In particular, both the first element and the second element are substantially made up, respectively, of a curvilinear part, designed to come into contact with the objects to be constrained, a straight central part and a flat end part. Furthermore, the engagement means comprise a spring engaged with a U-bolt and a chain which has a plurality of rings, each one of which being designed to hook onto the hooking means.

13 Claims, 1 Drawing Sheet

CLAMPING DEVICE

TECHNICAL FIELD

The present invention relates to a clamping device which is particularly suitable for use in the building industry, in metal structural work and also in carpentry and other sectors where it is necessary to fix one or more objects. At the moment, in the building industry for example, when finishing work has to be done on wall parts such as pillars, cornices, wall corners etc., a builder usually uses two metal or wooden boards, laying them out parallel with the sides of the structure to be refinished or constrained.

BACKGROUND ART

It is known that, to clamp the aforementioned boards in the position required, the current method is to use wooden or metal supports nailed to the boards themselves or a U-shaped piece, also wooden, is made whose two arms are attached or nailed to the corresponding board.

The system just described has some drawbacks.

An initial drawback comes from the fact that the aforementioned supports are unwieldy and they do not always manage to provide a constant pressure on the whole board and at times they cause the board to move in a damaging way which could lead to work being carried out which is not up to standard. Furthermore, the supports have a substantial side bulk which often limits their use.

A further drawback arises from the fact that the U-shaped piece obstructs and affects the builder's work in the area between the two boards, making it necessary in certain cases to move the U-shaped piece with the subsequent possibility of changing the original layout.

A further system in use to maintain the position of the boards and keep them constrained, is the use of a piece of iron rod, generally the type used for reinforcing reinforced concrete. The piece of iron rod is attached to the board, bent into the U-shape and then constrained to the other.

The system just described also has its drawbacks. An initial drawback was found to be the insufficient stability and the little holding power of the piece of iron rod since it is not always possible to make a part accurately and then fix it firmly to the boards.

A second drawback appears to be that if, for some reason, it is necessary to detach the piece of rod from the board, it is almost always impossible to reuse it, therefore a new piece must be prepared every time. All this leads to time wasting, a useless consumption of the materials and consequent increases in the working costs.

A further system envisages the use of small metal clamps but even these have shown to have their drawbacks.

A drawback, which is extremely limiting, is due to the difficulty involved in positioning the small clamps on the board since these can slip. To prevent them slipping, it should be a simple matter of clamping them but this destroys the homogeneity of the hold and results in different pressure at the various points of the board, with the risk of triggering off clamping and stability problems.

A further drawback comes from the fact that the small clamps are subject to considerable wear and tear caused by the presence of sand, dust and other substances.

DISCLOSURE OF INVENTION

The aim of the present invention is to solve the problems of the commonly known technique and overcome the drawbacks described above by means of a clamping device which can be adapted to fit any distance between the boards or objects to be held easily and then to clamp them.

A further aim of the present invention is to make available a device which can be used an unlimited amount of times and is much less bulky both when in use and not.

A still further aim of the present invention is to make available a lightweight, practical device which is flexible enough to be used in the building industry, in metal structural work, carpentry or any other sector.

A further aim of the present invention is to make available a device which is easy to manufacture and works well.

These aims and others, which will better emerge during the present description, are achieved in general by a clamping device according to the claims that follow.

Further characteristics and advantages of the present invention will better emerge from the detailed description of the clamping device that follows, with reference to the accompanying drawings, in the form of a non limiting example, in which.

Figure 2:
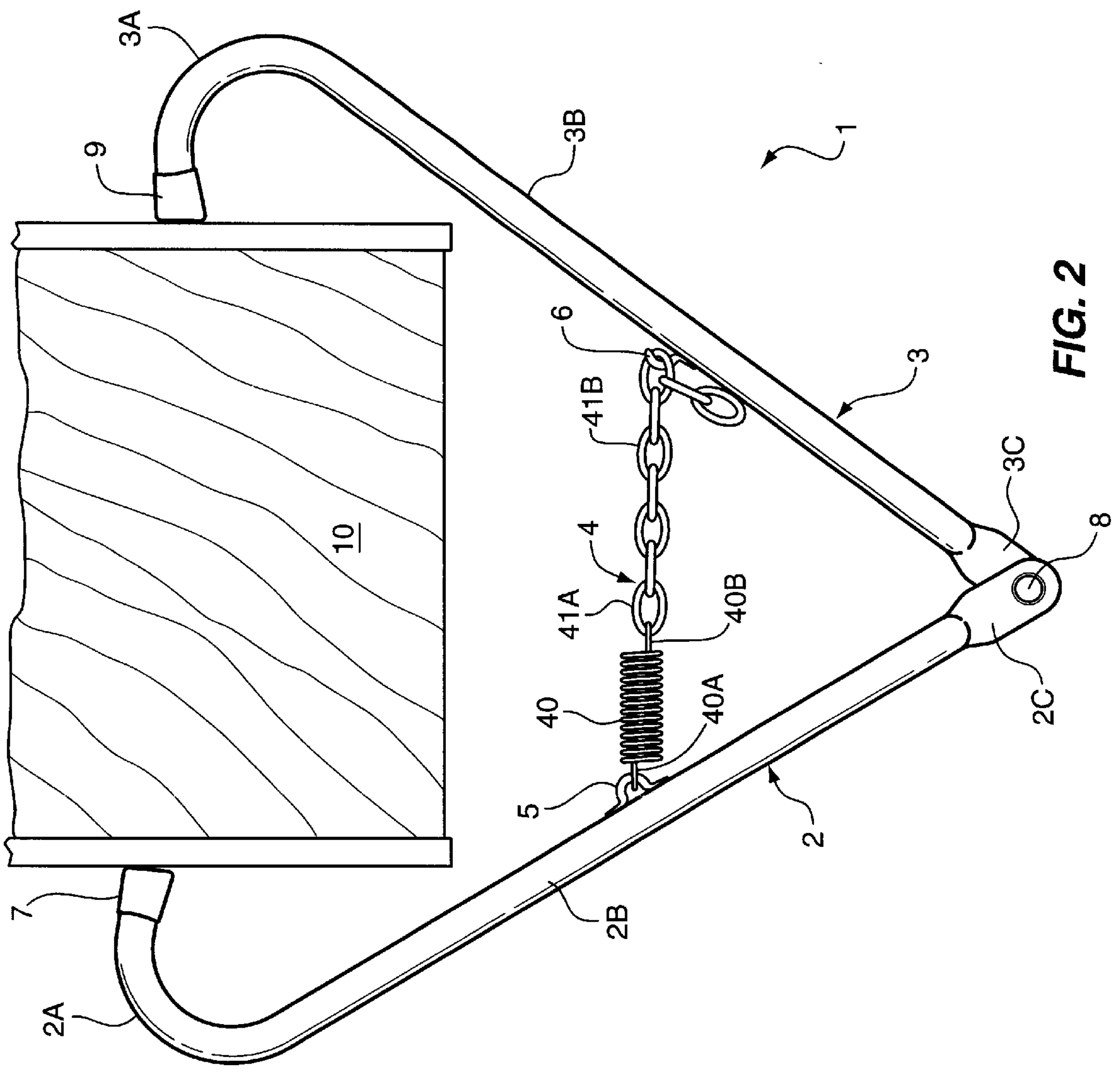
FIG. 2 shows a frontal position of the clamping device in the working position.
Figure 1:
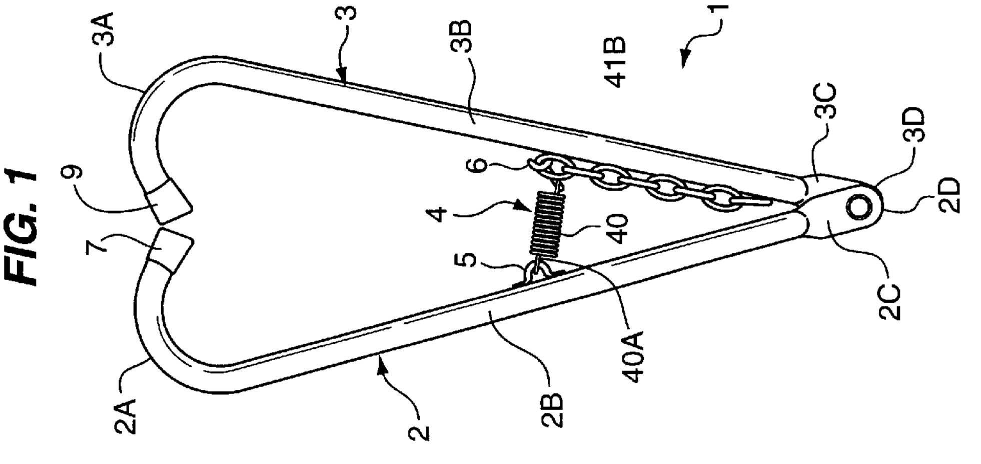
FIG. 1 shows a frontal view of the clamping device according to the invention in the resting position.

With particular reference to the figures mentioned, 1 indicates the entire clamping device according to the present invention.

The device 1 is comprised of a first element 2, which is substantially made up of a curvilinear part 2*a* designed to come into contact with the object to be constrained, a central part 2*b* which is almost straight and a flat end part 2*c*. Furthermore, the first element 2 has a U-bolt or eyelet 5 which is placed substantially in the centre of the central part 2*b*.

The device which is the object of the present invention comprises a second element 3 made up of curvilinear part 3*a* designed to come into contact with the object to be constrained, a central part 3*b* which is substantially straight and a flat end part 3*c* which is designed to engage with the corresponding 2*c* of the first element 2.

In greater detail, the first element 2 and the second 3 are arranged symmetrically and are mutually constrained in such a way that they can rotate in the respective end parts 2*c* and 3*c*. Each end part 2*c* and 3*c* has a slot, 20 and 30 respectively. The slot 20 and the slot 30 are placed one on top of the other and engaged by the locking means 8.

The locking means 8 include either a threaded screw or a shoulder screw or a rivet.

In accordance with the present form of embodiment, the clamping device comprises engagement means 4 which are constrained firmly to the first element 2 and designed to engage with the second element 3.

In particular, the engagement means 4 comprise a spring 40 which is engaged at one of its ends 40*a* with the U-bolt 5 and at the other end 40*b* with the end 41*a* of a chain 41.

The chain 41 has a plurality of rings 41*b*, each one of which being designed to hook onto the hooking means 6.

The hooking means 6 are substantially positioned in the centre of the central part 3*b* of the second element 3 and they are designed to engage with the rings of the chain 41 of the engagement means 4.

In addition to everything illustrated up to now, the first element 2 and the second element 3 are made from a tubular section which is preferably galvanised iron but can be any material as long as it is rigid.

Furthermore, the first element 2 and the second element 3 comprise, respectively, a closing element 7 and 9 placed at the free end of the curvilinear part 2_a_ and 3_a_. The closing elements 7 and 9 are made of a plastic material but they can also be made of rubber, wood or other materials.

The clamping device is designed to operate from a resting position, in which the first element 2 comes into contact with the second element 3 by means of the closing elements 7 and 9, and in a working position in which the first element 2 and the second element 3, after a rotation in which the closing elements separate, carry out a clamping and clamping action on an object 10.

After the predominantly structural description, the following section deals with the working of the invention.

The clamping device, when in the resting position, has the closing elements in contact with one another. When the device which is the object of the present invention needs to be used, the operator simply separates the two curvilinear parts so that the distance between these two curvilinear parts is slightly less than approximately ⅔ centimeters in relation to the distance between the objects to be held and clamped.

At this point, the ring of the nearest chain engages with the hooking means so that the position set beforehand can be maintained according to the distance between the objects to be clamped.

Once the device is set in the way just described, the operator puts the closing element of the first element into contact with the objects to be clamped, exerts a slight traction in order to increase the existing distance between the two closing elements, then positions the closing element of the second element against the opposite surface of the object to be held and interrupts the traction.

In this way, the device is locked and clamps the objects to be held firmly. Once the hold is finished, the user only has to reverse the procedure carried out up to that point.

In fact, to remove the device from the objects being held, the operator simply widens the device by exerting traction and rotating the first and second element and then remove the device itself from the objects.

At this point, the chain ring is removed from the hooking means and the operator can put the device back into the resting position with the closing elements in contact with each other and then insert a ring from the chain into the hooking means to prevent accidental movements and to lock the chain. In this way, the present invention achieves its aims.

In fact, the clamping device which is the object of the present invention is much smaller in size both in the working and resting positions.

The device opening can be adjusted to let objects of different thicknesses be inserted with case.

Furthermore, the device, according to the present invention can be used as many times as it is needed, unlike the commonly known technique, where the devices used are thrown away after one use.

To its advantage, the device which is the object of the present invention has a simple structure and has also proved to be easy to use because of the simplicity of the elements which make up its structure.

The device is lightweight, extremely practical, efficient and suitable for various uses in, for example, the building industry, metal structural work, carpentry or other sectors.

Obviously, by maintaining the principle of the present invention, various embodiments are possible and the relevant details can be varied widely with respect to this description and its illustration without falling outside the field of the present invention.

What is claimed:

1. A clamping device for use in the building industry, in the field of metal structure work and in the field of carpentry comprising a first element and a second element which are arranged symmetrical to each other, said elements each having a first end, a substantially straight part extending from said first end to an inwardly curved second end, said first ends being pivotally connected to each other and said second ends facing each other and being mutually constrained from movement relative to each other by an adjustable length, spring loaded connecting means connected to said first element and to said second element intermediate said first and second ends of each element, said device being designed to operate from a resting position in which said first element is pivotally connected with said second element and from a working position in which said first element and said second element clampingly or gripingly engage an object, said second element having hooking means fixed to said straight part intermediate said first and second ends and said adjustable length spring loaded connecting means comprises a chain which hooks with said hooking means and a spring, one end of which is connected to an eyelet fixed to said straight part of said first element intermediate said first and second ends of said first element and the other end of which is connected with said chain.

2. A clamping device as in claim 1, wherein said first element is substantially made up of a curvilinear part designed to come into contact with the object to be constrained, a central part which is substantially straight and a flat end part.

3. A clamping device as in claim 1 wherein said second element is substantially made up of a curvilinear part designed to come into contact with the objects to be constrained, a central part which is substantially straight and a flat end part designed to engage with the corresponding part of the first element.

4. A device as in claim 1, wherein said first element and said second element rotate through their mutual engagement.

5. A clamping device as in claim 1, wherein said first element has an eyelet fixed to said straight part intermediate said first and second ends and said adjustable length spring loaded connecting means comprises a spring which is connected to said eyelet.

6. A clamping device as in claim 1, wherein said chain has a plurality of rings, each of which is positioned to hook on to said hooking means.

7. A clamping device as in claim 1, wherein said first element and said second element are tubular.

8. A clamping device as in claim 1, wherein said each second end is capped with a cap made of one of plastic, wood or rubber material.

9. A device as in claim 2, wherein each end part has a slot.

10. A device as in claim 1, wherein said device comprises locking means.

11. A clamping device as in claim 1 wherein said first ends of said first and second elements are pivotally locked together by one of a threaded screw or shoulder screw or a rivet.

12. A clamping device as in claim 1, wherein said device is made of galvanized iron.

13. A device as in claim 3 wherein, each end part has a slot.

* * * * *